UNITED STATES PATENT OFFICE.

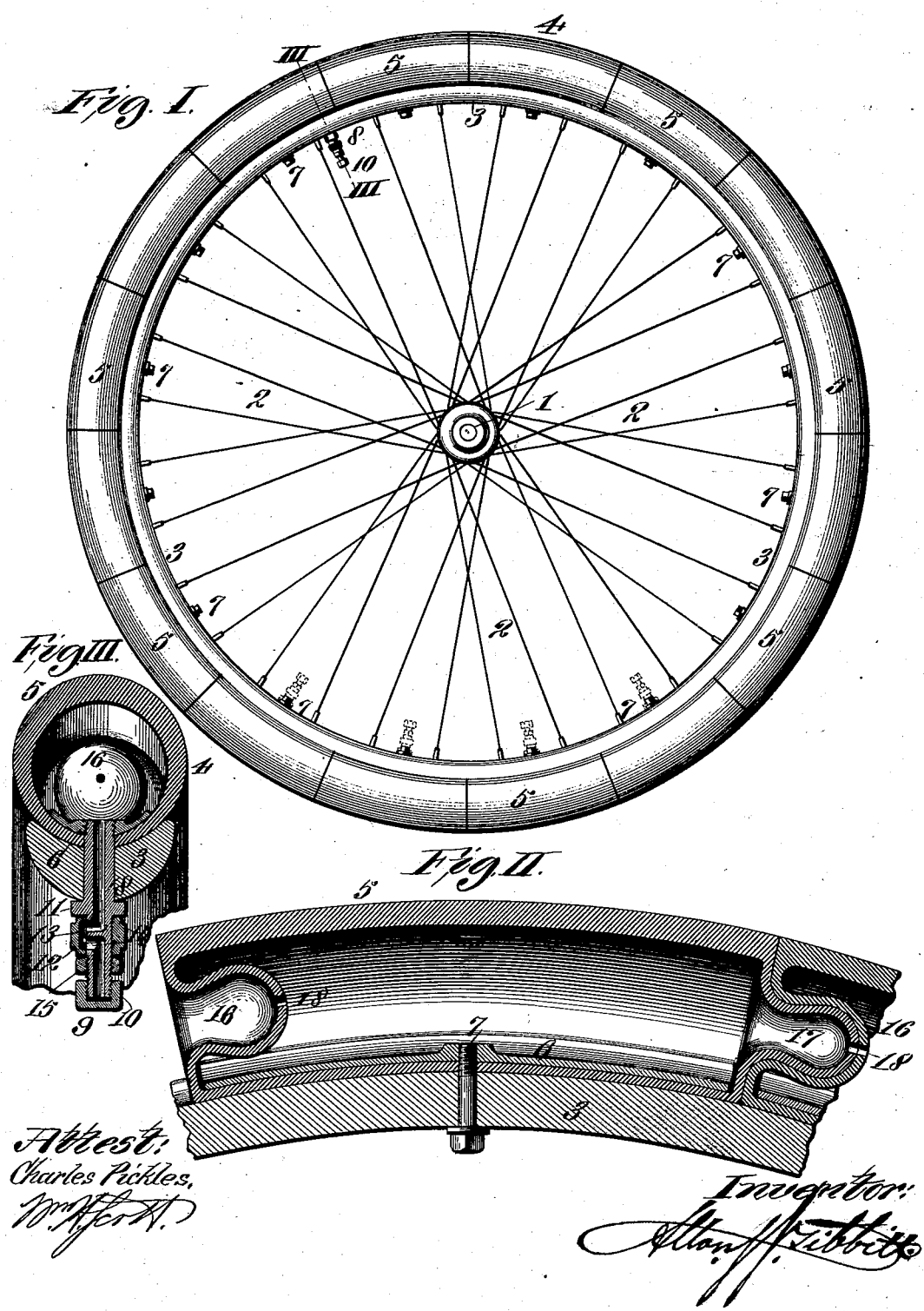

ALTON W. TIBBITT, OF ST. LOUIS, MISSOURI, ASSIGNOR OF ONE-THIRD TO HENRY C. TUCKER.

SECTIONAL PNEUMATIC TIRE.

SPECIFICATION forming part of Letters Patent No. 567,521, dated September 8, 1896.

Application filed November 29, 1895. Serial No. 570,550. (No model.)

*To all whom it may concern:*

Be it known that I, ALTON W. TIBBITT, a citizen of the United States, residing at St. Louis, in the State of Missouri, have invented a certain new and useful Improvement in Sectional Pneumatic Tires, of which the following is a specification.

The object and purpose of my invention are to so construct a pneumatic tire for bicycles or kindred devices that it may be easily and quickly repaired should any portion become torn or punctured, and at the same time maintain a uniform resistance to compression throughout the length and circumference.

Figure 1 is an elevation of a sectional-tired wheel; Fig. 2, a detailed vertical longitudinal section through the rim, one section, and a part of another; Fig. 3, a vertical transverse section on line III III of Fig 1.

1 is a hub of any form or construction, to which are secured the spokes 2, the outer end of the spokes being secured to the rim or felly 3, the outer surface of which being concave.

4 is the tire, of some elastic material, and consists of sections 5, abutting each other and forming a continuous and smooth outer surface to be contacted with the ground. The adjacent ends of each section are constructed to fit closely. At each end of the said sections are nipples 16 and 17, one of which is external of the section and projects outward, while the one at the opposite end projects into the interior of the section. The relative size of said nipples are such that one shall enter and fit closely within the other, by which two sections are held firmly together at their abutting ends.

6 is a metallic plate on the inside of each section upon the side adjacent to the rim, and may be embedded within the material forming the section, or may be held in contact with the interior of the section by means of bolt 7, extending through the rim and screw-threaded into the plate 6, by which means each section is firmly held in a fixed position against the rim. In the terminals of each nipple a small perforation 18 is provided, the said perforations registering with each other, registering and forming a communication between the interior of the sections by which the entire tire may be inflated from one point, the air passing through the perforation and forming a continuous opening throughout the entire length.

8 is a valve-stem, also serving as a retaining-bolt, through which is a passage 9, and closed with a cap 10. At the exterior end 11 is the bolt-head.

12 is a valve fitted tightly on the stem and provided with a recess 13, registering with the branch ports 14. At each side is a gasket, serving to make a tight joint when the valve is held by means of the nut 15. The construction as described employs but a single filling or charging valve.

The construction as shown in Figs. 1, 2, and 3 is put into place, held, and inflated as follows: The sections are put in place on the rim, the nipples of the sections interlocking with each other, as shown in Fig. 2, and the openings in the spring-plate registering with the openings in the rim, through which the bolts are inserted and turned until their heads are in contact with the inner surface of the rim, thus drawing and holding each section firmly against the exterior surface of the rim. The several sections now being in place, the cap on the valve-stem is removed and air forced through the valve-stem by the passage and ports and recess in the valve until the desired pressure is attained, when the recessed valve is rotated on the stem about a half-turn, thus shutting off all exterior communication. The cap is then replaced to exclude dust and dirt, the wheel then being in condition for use. By the construction shown should one of the sections be torn or punctured it may be readily removed by unscrewing the holding-bolt and a new one inserted in the place, after which the section or the entire tire may be inflated.

Having thus described my invention, what I wish to claim is—

1. In a sectional tire for bicycles, circular in cross-section, and provided with an interior nipple at the opposite end of each section, and adapted to engage the nipples of the next succeeding section; openings in the said nipples registering with each other, whereby air may pass from one section to another, throughout the length of the tire, and means provided on one section whereby air may be admitted to the interior thereof.

2. In a sectional tire for bicycles circular in cross-sections, means of communication between each section forming the complete tire from end to end, means for securing each section in place on the rim of the wheel, said means consisting of a plate, upon the interior of each section, and extending from end to end thereof, a bolt passing through the rim of the wheel, the head of which bears against the rim, and the shank screwing into the plate in each section.

ALTON W. TIBBITT.

Witnesses:
LEO L. WAGNER,
CHAS. L. DURPHY.